Dec. 21, 1965     H. S. PIETRZAK     3,224,014
BOWL GASKET SLEEVE ASSEMBLY
Filed Dec. 16, 1964     2 Sheets-Sheet 1
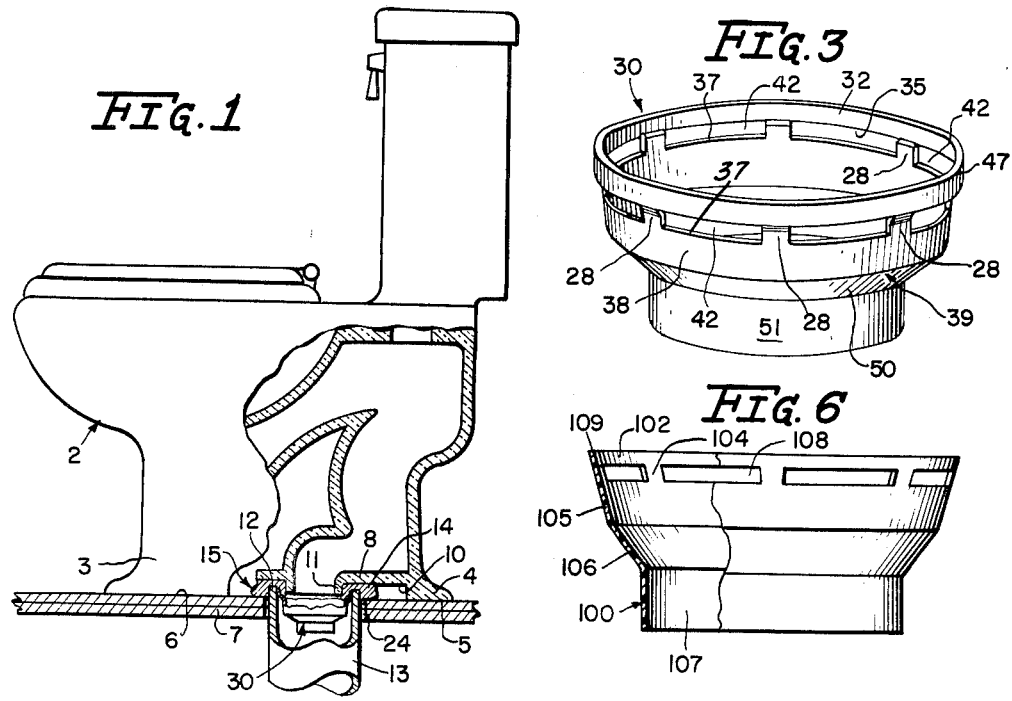
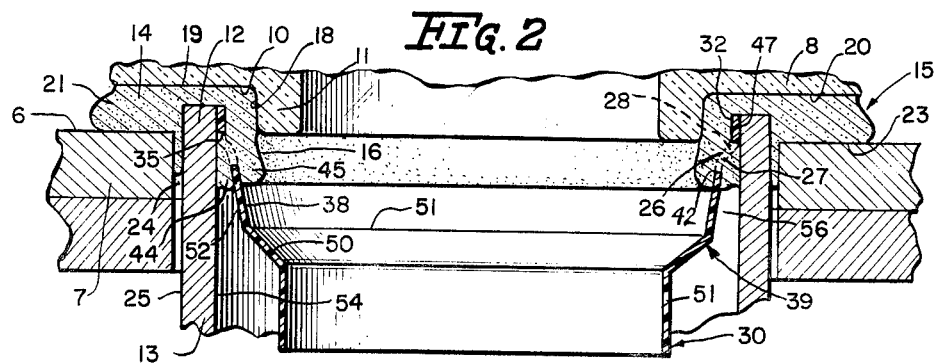
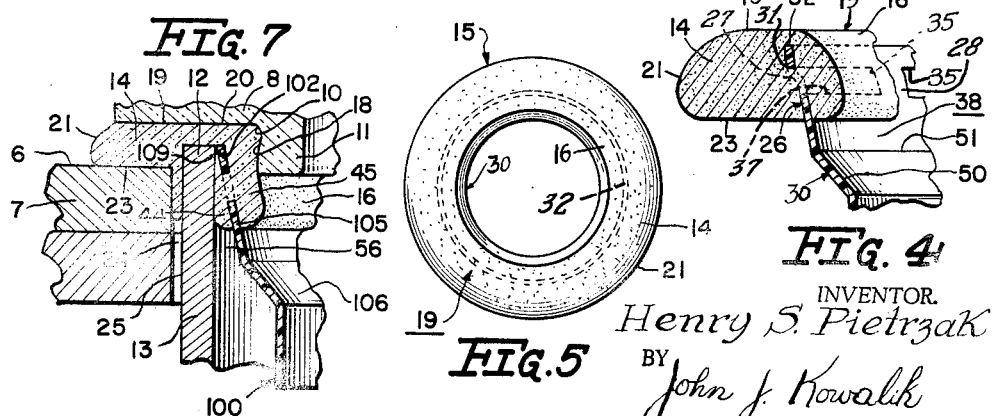
INVENTOR.
Henry S. Pietrzak
BY John J. Kowalik
Atty.

Dec. 21, 1965  H. S. PIETRZAK  3,224,014
BOWL GASKET SLEEVE ASSEMBLY
Filed Dec. 16, 1964  2 Sheets-Sheet 2
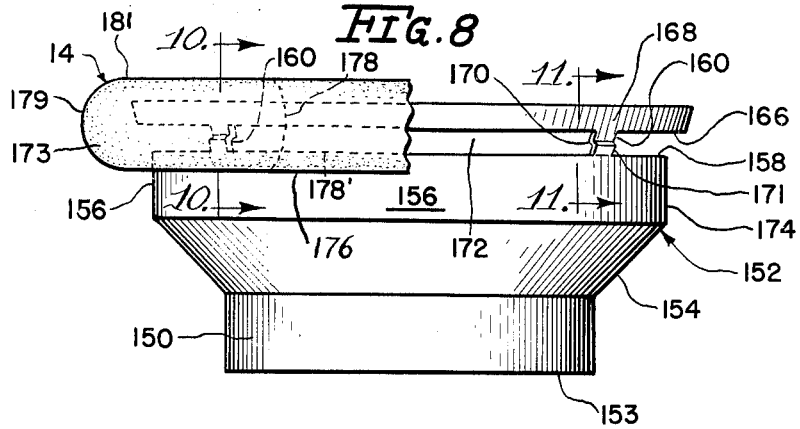
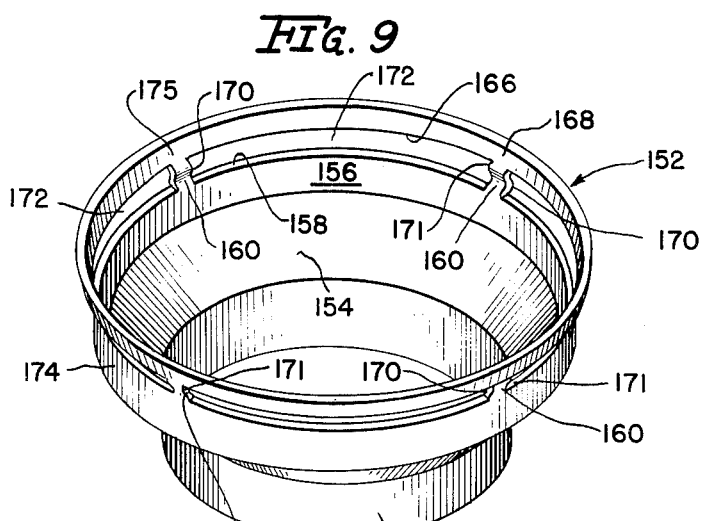
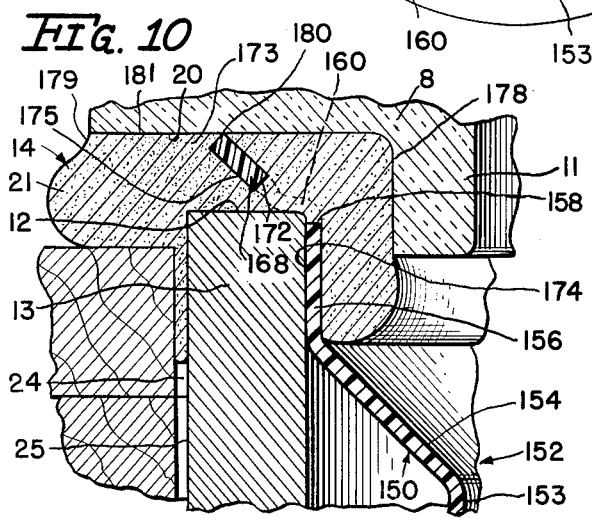
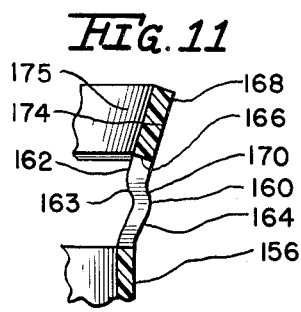
INVENTOR.
Henry S. Pietrzak
BY
John J. Kowalik
Atty.

United States Patent Office 3,224,014
Patented Dec. 21, 1965

3,224,014
BOWL GASKET SLEEVE ASSEMBLY
Henry S. Pietrzak, 3821 W. Touhy Ave.,
Lincolnwood, Ill.
Filed Dec. 16, 1964, Ser. No. 421,744
9 Claims. (Cl. 4—252)

This invention appertains to the plumbing arts and more specifically to an improved gasket and sealing structure for mounting a toilet bowl to an outlet. This application is a continuation in part of my copending application Serial No. 188,712 filed April 19, 1962, for Bowl Sleeve Gasket Assembly, now abandoned.

In the installation of toilet bowls, especially in new constructions, there are numerous instances where the outlet pipe is slightly out of plumb that is, inclined from the vertical or the upper edge of such pipe is below floor level or at an excessive height above the floor surface. Each of these deviations of the outlet pipe from the optimum position poses a serious problem to properly seal the mating.

The invention comprehends the provision of a novel seal and gasket structure which is readily conformable to the various conditions encountered without in any way impairing the effectiveness of the seal and wherein in fact the novel gasket structure, which in effect is an extension for the toilet bowl horn, enhances the sealing action of the sealing substance and materially improves the connection.

A general object of the invention is to devise a novel sealing assembly which includes a flexible tubular member providing an extension for the toilet bowl horn and which is so constructed as to obtain an extrusion of the sealing material through openings in the tubular member in the event that the sealing material is displaced from within the member because of mismating of the parts or otherwise such material flowing into the space between the extension and the outlet pipe or from between the outlet pipe and the member to the space between the member and the toilet bowl horn.

A principal object of the invention is to devise a simple and effective sealing assembly which is relatively inexpensive and which readily lends itself to economical manufacturing practices.

A more specific object of the invention is to devise a novel sealing structure which incorporates a tubular member made of plastic material such as nylon or polyethelene and which comprises an upwardly planed upper conical portion which merges into a cylindrical lower portion, the upper edge of the upper portion being preferably of the diameter of conventional soil pipe, namely 4", and tapering into an inwardly stepped lower portion of lesser diameter, the upper and lower portions being interconnected by a plurality of circumferentially spaced straps which with the upper and lower portions define circumferentially elongated slots which admit the sealing compound therethrough and serve to anchor the sleeve into the sealing material and also accommodating free flow between the interior and exterior of the sleeve of the sealing substance which is cast as an annulus about the upper portion and the upper section of the lower portion, said sleeve being embedded in the annulus from its lower edge and the annulus having portions within, above and without the sleeve and embracing the upper portion and upper section of the lower portion therebetween and extending through the slots.

In one form of the invention the sleeve comprises an upper ring portion and a lower sleeve portion and a flexible means interconnecting these portions to accommodate insertion of the sleeve into the outlet pipe in the event of misalignment of the toilet horn and the outlet pipe.

A further object of the invention is to provide a novel interlock between the sealing ring and the sleeve, said interlock comprising a perforated conical upper portion on the sleeve imbedded in the ring of sealing material.

A further object of the invention is to provide a novel toilet bowl gasket assembly incorporating a horn extension which is axially flexible whereby the assembly will fit between the toilet bowl and the soil pipe wherein the spacing therebetween is less than the extended position of the extension.

Another object is to provide a toilet bowl gasket assembly including a sleeve extension having axially spaced portions interconnected by thin straps which are contoured to provide a good anchor for the extension in the sealing wax and at the same time enhance the resiliency of the extension so that it is self-fitting within the different space limitations between the toilet and the soil pipe.

These and other objects inherent in and encompassed by the invention will become more readily apparent from the specification and the drawings, wherein:

FIGURE 1 is a side elevational view of the novel toilet bowl mounting partly in vertical section;

FIGURE 2 is a fragmentary enlarged sectional view of the sectional portion of FIGURE 1;

FIGURE 3 is a perspective view of the novel sleeve;

FIGURE 4 is an enlarged fragmentary sectional view of the sleeve in combination with the sealing ring;

FIGURE 5 is a plan view of the sealing gasket assembly;

FIGURE 6 is a side elevational view partly in axial section of another embodiment of the sleeve, and FIGURE 7 is a fragmentary sectional view of a sealing assembly incorporating the sleeve of FIGURE 6 and showing its association with the toilet bowl horn and the outlet pipe;

FIGURE 8 is a side elevational view of a further embodiment of the toilet bowl sleeve assembly with a portion of the sealing substance removed;

FIGURE 9 is a perspective view of the sleeve of FIGURE 8;

FIGURE 10 is a fragmentary sectional view taken substantially on line 10—10 of FIGURE 8 showing the device applied to a toilet bowl and discharge pipe, and FIG. 11 is an enlarged cross-sectional view taken substantially on the line 11—11 of FIGURE 8.

Description of the invention

Describing the invention in detail and having particular reference to FIGURES 1–5 of the drawings, there is shown a conventional toilet bowl 2 which has a base or pedestal portion 3 providing a peripheral seating flange 4 with a lower base surface 5 which seats on the surface 6 of a floor 7. Interiorly of the flange 4 there is provided on the bowl a wall portion 8 which is offset vertically from the surface 5 and develops with the flange 4 a depression or cavity or pocket 10 which surrounds a depending horn or nipple 11 which under normal circumstances is adapted to fit concentrically into the upper end of the outlet soil pipe 13 which in optimum condition projects with an upper edge portion 12 above the level of the floor surface 6 spaced below wall 8.

The pipe 13 normally embeds into the ring 14 of the novel gasket seal assembly generally designated 15 and deforms the sealing substance as best seen in FIGURE 2 wherein it will be observed the interior periphery 16 of the ring 14 which in original form is frusto-conical as seen in FIGURES 4 and 5 is deformed into a conforming generally cylindrical shape about the exterior surface 18 of the toilet bowl nipple 11, and the radial upper flat edge 19 of the ring 14 is pressed against the underside surface 20 of the toilet bowl wall 8 and deforms into conformance thereagainst. The outer peripheral edge 21 of the ring flows outwardly dependent upon the axial compression of the ring 14 which before assembly is somewhat rectangular in cross-section. The bottom flat edge 23 of the ring is pressed against the floor surface 6 and will deform to flow into various openings such as at 24 about the external side 25 of the outlet pipe 13.

As best seen in FIGURE 4, the bottom edge 23 of the ring 14 is provided with an axially directed annular slot generally designated 26 intermediate its inner and outer circumferential edges or peripheries 16 and 21. The slot 26 has a radially stepped intermediate portion 27 which admits a complementary stepped portion comprised of straps 28 of the extension sleeve generally designated 30. The upper portion 31 of the slot 26 is substantially cylindrical and receives a generally cylindrical upper portion 32 of the sleeve which at its lower edge 35 is connected at circumferentially spaced intervals with the upper ends of a plurality of the narrow straps 28 which at their lower edges merge into the upper edge 37 of the intermediate frusto-conical portion 38 of the sleeve 30.

The straps 28 with the margins 35, 37 develop a plurality of circumferentially elongated apertures or openings 42 therebetween which are filled with the sealing material of the ring 14 interconnecting the outer portion 44 of the ring with the inner portion 45 thereof as shown in FIGURE 2.

Thus it will be readily noted that the upper anchoring and aligning cylindrical portion 32 which is designed of an overall diameter of 4" is adapted to fit with its external periphery 47 fitting within the conventional 4" soil pipe, if such is being used. Since the sleeve 30 is made about ⅛" thick of flexible materials such as nylon or polyethylene the upper portion which is of the order of 3/16" in depth having a 4" O.D. and 3⅞" I.D., the structure is adaptable to ready distortion and will fit into various contours and generally sleeve into the rough interior surface of the cast iron soil pipe. The lower portion 39, being interconnected to the upper portion by the narrow straps which are about ¼" wide and 3/16" long, is readily deflectible transaxially of the upper portion to fit various conditions of misalignment or pipe contour etc.

It will be noted that the straps provide an inward step of about 1/16" and that the portion 38 of the sleeve tapers down to 3¾" O.D. and has a depth of ½" and merges into a more acutely downwardly tapered lower conical portion 50 5/16" in depth and which has an upper edge 51 with an O.D. of 3¾" and a lower edge with an O.D. of 3" whereat it merges into the upper edge of a cylindrical lower portion 51 11/16" in depth.

The foregoing dimensions of course are illustrative and are not in themselves to be considered as in any way limiting the instant invention although these dimensions have been used and are satisfactory with only four straps 28.

It will be seen that the outer portion 44 of the ring substance provides a seal between the exterior 52 of the sleeve 30 and the interior 54 of the soil pipe and thus in combination with the passages 42 there is a transfer of the sealing medium from the interior to the exterior of the extension sleeve 30 so that even though the nipple 11 should be off center with respect to the pipe 13 or if the cylinder portion 32 of the sleeve should be distorted, the ring portion 44 of the sealing medium would be packed into the space between the exterior of the sleeve extension and the interior of the outlet pipe. The space 56 developed between the inwardly offset portion 38 and the pipe narrows upwardly to wedge the material therebetween.

*Embodiment of FIGURES 6–7*

The modification of the invention shown in FIGURES 6 and 7 is comparable to that of the preceding embodiment and therefore like reference numerals will be corresponding parts.

In this embodiment, the sleeve generally designated 100 has an upper downwardly tapered conical ring portion 102 which is connected by the straps 104 to the intermediate portion 105 which continues with the same taper downwardly and at its lower edge merges into a more acutely tapered lower portion 106 which at its lower edge merges into the 3" O.D. cylindrical lower portion 107. The material of the sleeve is nylon or polyethylene or other similar noncorrodible flexible material. The upper and intermediate portions are relatively displaceable transaxially and the slots or passages 108 are filled with the sealing substance and interconnect the inner and outer portion 44 and 45 FIGURE 7 of the sealing ring 14. The upper edge 109 of the sleeve is substantially of 4" O.D. and thus fits a codimensional outlet pipe. In essence the action of the sleeve, gasket material etc. are similar to those described in the previous embodiment.

*Embodiment of FIGURES 8–11*

In the embodiment of the invention shown in FIGURES 8 through 11, the parts identical with those of the previous embodiments are identified with corresponding reference numerals.

In the present embodiment, the sleeve assembly 150 comprises a sleeve 152 having a reduced diameter lower cylindrical portion 153 which at its upper edge merges into a funnel-like frusto-conical intermediate portion 154 which in turn merges into the lower edge of a cylindrical ring portion 156 which is adapted to fit into the soil pipe 13. The ring 156 terminates in an upper edge 158 which at equally spaced circumferentially displaced areas is connected to the lower edge of a plurality of straps or connectors 160.

Each strap is somewhat Z-shaped in cross-section having a plurality of angularly arranged interconnected portions 162, 163, 164 which are adapted to accordion axially of the sleeve structure generally indicated 152.

The upper ends of straps 160 are integrally united with the lower edge 166 of an upper preferably frusto-conical annulus or anchor ring 168 which is of larger diameter than the external diameter of ring 156. The ring 168 is preferably dimensioned to overlap the upper end 12 of a four inch soil pipe.

The lower edge 166 of the upper rnig 168 and the upper edge 158 of ring 156 and the lateral edges 170 and 171 of the adjacent straps define transaxial, circumferentially elongated passages 172 which permit passage from the external side 174 of the sleeve structure to the internal side 175 of the sealing substance as it is compressed and deformed between the toilet bowl and the pipe and the floor. The sealing substance in this embodiment as well as in the previous embodiments may be such as is well known in the art, namely, wax or petroleum wax or putty or like material such as flowable latex compositions.

The upper end portions of the sleeve assembly 150 is embedded through the lower side 176 into the sealing ring generally indicated 14 and formed from the substance 173.

The upper portion of the sleeve assembly 150 comprising the upper portion 178' of the annular ring or intermediate portion 156, the straps 160 and the upper frusto-conical portion 168 are entered into the ring 14 and the upper portion of the sleeve assembly is deformable radially as well as axially and thus does not exude the sealing substance and form leakage areas. The upper portion of the sleeve assembly normally is substantially medially between the inner and outer peripheries 178, 179 and the upper edge 180 of the portion 168 is normally below the top surface 181 of the sealing ring.

As best seen in FIGURE 10, the space between the surface 20 and the upper edge 12 of the soil pipe 13, if lesser than the normal extent of the plastic sleeve which may be of polyethylene or nylon or other resinous polymer, and dimensioned as the previous embodiments, the straps 160 collapse or accordion by the upper edge 180 engaging the surface 20 and thus the ring 168 is urged downwardly. Thus in addition to the sealing substance, which flows about the horn 11 and between the outer side of pipe 13 and the floor surface 6 and surface 20, sealing the joint, the resilient bias of the straps and material of the sleeve assembly affords a seal between the sleeve and the toilet bowl.

It will be understood that various sizes of the sleeves may be provided to fit various size pipes, etc. Dimensionally the sleeve portions may be the same as previously described.

In addition, the interflow of the sealing substance transaxially of the sleeve assembly insures that the substance will not be squeezed out of the joint during assembly.

While several modifications of the invention are exemplified herein, they, of course, are merely for purpose of illustration and various changes in the construction may be resorted to in the course of manufacture in order that the invention may be utilized to best advantage according to circumstances which may arise, without in any way departing from the spirit and intention of the invention, which is to be limited only in accordance with the scope of the appended claims.

I claim:

1. In a sealing gasket for a toilet bowl, the combination which comprises a ring of pliable and flowable material and having axially spaced sides and inner and outer peripheral surface, a sleeve having axially spaced portions, one portion being diametrically larger than the other, said one of said portions imbedded in said ring through one of said sides intermediate said surfaces, and relatively highly yieldable means extending transaxially of the sleeve and interconnecting said portions within said ring and, providing with said portions passageways accommodating interflow of the material of the ring between opposite sides of the sleeve.

2. For a toilet bowl connection with an outlet pipe, a sealing structure including a ring of a pliable sealing substance, a sleeve of flexible plastic material having one end portion imbedded into an end of the ring and having another end portion disposed in axial extension of the ring, and means substantially more flexible than said end portions yieldably interconnecting said one and other end portions of the sleeve accommodating radial and axial deflection therebetween.

3. The invention according to claim 2 and said one end portion being diametrically larger than the other portion, and said yieldable means comprising straps of narrow circumferential width extending axially and diagonally radially between said portions of the sleeve and developing therewith passages, and said substance filling the passages and flowable therethrough.

4. The invention according to claim 2 and said one end portion of the sleeve being of larger diameter than the other portion and said sleeve having a tapered portion between said end portions thereof with at least a part of the tapered portion embedded within the sealing substance.

5. The invention according to claim 2 and said one end portion being substantially frusto-conical.

6. A seal having a ring of pliable material and a sleeve connected thereto and positioned in axial extension thereof and having axially spaced portions and highly flexible integral perforated means of the same material as the sleeve interconnecting the portions whereby said portions are axially displaceable with respect to each other.

7. In a gasket for sealing a connection between a toilet bowl and a soil pipe, a pliable substance sealing ring having top and bottom sides and inner and outer peripheries, a sleeve having an upper part embedded in said sealing ring through said bottom side, said sleeve having a bottom part depending below the ring and being of smaller diameter than the upper part, and a plurality of spaced flexible elements interconnecting the upper and lower parts, said substance flowing through the spaces between said elements transaxially of the sleeve, and said flexible elements being accordion-shaped and deflectible axially of the sleeve and accommodating relative movement between the upper and lower portions axially of the gasket.

8. In a sealing gasket assembly, a ring of sealing wax having upper and lower sides and inner and outer peripheries, a sleeve of polyethylene having an upper part embedded into the ring between the peripheries and having an upper edge below the upper side of the ring, said sleeve having a lower part below the ring, and means having foldable portions interconnecting the upper and lower parts, said parts foldable to shorten the sleeve assembly, and said upper portion being of larger diameter than the lower portion and said foldable means comprising flexible straps and said straps being zigzag in cross-section.

9. A sleeve for a sealing gasket between a toilet bowl and soil pipe comprising a lower tubular section, an intermediate funnel-shaped portion flaring upwardly from the lower section, a plurality of straps flexible axially and transaxially of the sleeve and defining passages therebetween, and an upper ring of larger diameter than the funnel-shaped portion connected by the straps thereto, said straps extending diagonally upwardly and outwardly from the axis of the sleeve.

References Cited by the Examiner

UNITED STATES PATENTS

| | | | |
|---|---|---|---|
| 600,961 | 3/1898 | Burnett | 277—212 X |
| 2,736,583 | 2/1956 | Marvin | 277—235 X |
| 2,750,216 | 6/1956 | Thies | 277—32 X |
| 2,899,690 | 8/1959 | Clifford | 288—58 X |
| 2,976,543 | 3/1961 | Turner et al. | 4—252 |
| 3,037,212 | 6/1962 | Kleinhof | 4—252 |

LAVERNE D. GEIGER, *Primary Examiner.*

H. J. GROSS, *Assistant Examiner.*